(12) United States Patent
Lee

(10) Patent No.: US 12,626,184 B2
(45) Date of Patent: May 12, 2026

(54) ELECTRONIC DEVICE FOR UPDATING ARTIFICIAL INTELLIGENCE MODEL AND OPERATING METHOD THEREOF

(71) Applicant: SAMSUNG ELECTRONICS CO., LTD., Suwon-si (KR)

(72) Inventor: Dongsoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1114 days.

(21) Appl. No.: 17/508,593

(22) Filed: Oct. 22, 2021

(65) Prior Publication Data

US 2022/0138628 A1 May 5, 2022

Related U.S. Application Data

(63) Continuation of application No. PCT/KR2021/013533, filed on Oct. 1, 2021.

(30) Foreign Application Priority Data

Oct. 29, 2020 (KR) ........................ 10-2020-0142523

(51) Int. Cl.
*G06N 20/00* (2019.01)

(52) U.S. Cl.
CPC .................................... *G06N 20/00* (2019.01)

(58) Field of Classification Search
CPC ........... G06N 20/00; G06N 3/08; G06N 3/063
See application file for complete search history.

(56) References Cited

U.S. PATENT DOCUMENTS 10,643,124 B2    5/2020  Yu et al.
12,045,725 B1 *  7/2024  Sather .................... G06N 3/048

2017/0286830 A1    10/2017  El-Yaniv et al.
2018/0095140 A1 *   4/2018  Park ..................... G01R 31/378
2018/0218518 A1     8/2018  Yan et al.
2020/0151558 A1     5/2020  Ren et al.
2020/0327451 A1    10/2020  Geraci et al.
2021/0064634 A1 *   3/2021  Guo .................... G06F 18/2413
2021/0089888 A1 *   3/2021  Gope ....................... G06N 3/08

FOREIGN PATENT DOCUMENTS

KR      10-2020-0094834 A       8/2020
KR      10-2020-0120557 A      10/2020

OTHER PUBLICATIONS

Lin, Xiaofan et al., "Towards Accurate Binary Convolutional Neural Network", 31st Conference on Neural Information Processing Systems (NIPS 2017), Long Beach, CA, USA., arXiv:1711.11294v1 [cs.LG], Nov. 30, 2017. (14 pages total).
International Search Report and Written Opinion issued Jan. 17, 2022 by the International Searching Authority in International Patent Application No. PCT/KR2021/013533. (PCT/ISA/220-PCT/ISA/210-PCT/ISA/237).

* cited by examiner

*Primary Examiner* — Cesar B Paula
*Assistant Examiner* — David Tan
(74) *Attorney, Agent, or Firm* — Sughrue Mion, PLLC

(57) ABSTRACT

Provided is a method, performed by an electronic device, of updating a pre-trained artificial intelligence (AI) model may include obtaining a sum, of at least two first factor values to which at least two second factor values are respectively applied, as a quantized value of a first weight value from among a plurality of weight values included in the pre-trained AI model; obtaining training data for updating the pre-trained AI model; updating the pre-trained AI model based on the the training data.

5 Claims, 7 Drawing Sheets

ELECTRONIC DEVICE FOR UPDATING ARTIFICIAL INTELLIGENCE MODEL AND OPERATING METHOD THEREOF

CROSS-REFERENCE TO RELATED APPLICATIONS

This application is a continuation application of International Application No. PCT/KR2021/013533, filed on Oct. 1, 2021, which is based on and claims priority to Korean Patent Application No. 10-2020-0142523, filed on Oct. 29, 2020, in the Korean Intellectual Property Office, the disclosures of which are incorporated by reference herein in their entireties.

TECHNICAL FIELD

The disclosure relates to an electronic device for updating an artificial intelligence (AI) model, based on training data, and an operating method thereof.

BACKGROUND ART

An AI model may be continuously updated so that an appropriate result value is output according to a change in a surrounding environment or a change in a user's state, taste, or the like. Because the AI model includes a large number of nodes, a significant amount of computation may be required to update the AI model by modifying a weight value applied to each of the nodes.

However, because information about a situation in which the AI model is used, such as the surrounding environment or the user's state, taste, or the like, is continuously changing, in order to provide a service suitable for a current situation at an appropriate time by using the AI model, it is preferable to update the AI model to suit the current situation as soon as possible based on the changed information about the situation.

Accordingly, in order to rapidly update the AI model, the amount of computation is considerable and thus high-performance resources should be provided, which is costly.

As such, there is a demand for a method of rapidly updating an AI model which may require a significant amount of computation, even with limited resources.

DESCRIPTION OF EMBODIMENTS

Technical Problem

To address the foregoing technical problems, the disclosure provides an electronic device for updating an AI model and an operating method thereof.

Also, the disclosure provides a computer-readable recording medium having recorded thereon a program for executing the operating method on a computer. The technical problems to be solved are not limited to those described above, and other technical problems may be present.

Technical Solution to Problem

According to an aspect of the disclosure, a method, performed by an electronic device, of updating a pre-trained artificial intelligence (AI) model may include obtaining the pre-trained AI model; obtaining a sum, of at least two first factor values to which at least two second factor values are respectively applied, as a quantized value of a first weight value from among a plurality of weight values included in the pre-trained AI model; obtaining training data for updating the pre-trained AI model; and updating the pre-trained AI model based on the training data. Updating the pre-trained AI model may comprise modifying the first weight value based on modifying the at least two first factor values and maintaining the at least two second factor values.

The at least two first factor values may be positive real numbers, and the at least two second factor values are -1 or 1.

The method may include determining the at least two first factor values as a same value for the first weight value and a second weight value from among the plurality of weight values; and determining the at least two second factor values as different values for each of the first weight value and the second weight value.

The method may include, based on an accuracy of the pre-trained AI model being equal to or less than a reference value, determining the pre-trained AI model as the pre-trained AI model of a first phase; and based on the accuracy greater than the reference value, determining the pre-trained AI model as the pre-trained AI model of a second phase.

The method may include updating the pre-trained AI model of the second phase based on modifying the at least two first factor values, and maintaining the at least two second factor values.

The method may include updating the pre-trained AI model of the first phase based on modifying the first weight value that is not quantized, or based on modifying the at least two first factor values or the at least two second factor values, based on the training data.

The training data may include information obtained as a surrounding situation of the electronic device or state information of a user is continuously changed, and the pre-trained AI model may be repeatedly updated, based on the training data.

According to an aspect of the disclosure, an electronic device for updating a pre-trained artificial intelligence (AI) model may include a memory configured to store the pre-trained AI model; and at least one processor configured to: obtain a sum, of at least two first factor values to which at least two second factor values are respectively applied, as a quantized value of a first weight value from among a plurality of weight values included in the pre-trained AI model, obtain training data for updating the pre-trained AI model, and update the pre-trained AI model based on the training data. The at least one processor configured to modify the first weight value based on modifying the at least two first factor values and maintaining the at least two second factor values.

The at least two first factor values may be positive real numbers, and the at least two second factor values are -1 or 1.

The at least one processor may determine the at least two first factor values as a same value for the first weight value and a second weight value from among the plurality of weight values, and determine the at least two second factor values as different values for each of the first weight value and the second weight value.

The at least one processor may, based on an accuracy of the pre-trained AI model being equal to or less than a reference value, determine the pre-trained AI model as the pre-trained AI model of a first phase; and, based on the accuracy being greater than the reference value, determine the pre-trained AI model as the pre-trained AI model of a second phase.

The at least one processor may update the pre-trained AI model of the second phase based on modifying the at least two first factor values, and maintaining the at least two second factor values.

The at least one processor may update the pre-trained AI model of the first phase based on modifying the first weight value that is not quantized, or based on modifying the at least two first factor values or the at least two second factor values, based on the training data.

The training data may include information obtained as a surrounding situation of the electronic device or state information of a user is continuously changed, and the pre-trained AI model may be repeatedly updated, based on the training data.

According to an aspect of the disclosure, a non-transitory computer-readable medium may store one or more instructions that, when executed by one or more processors, cause the one or more processors to: obtain the pre-trained AI model; obtain a sum, of at least two first factor values to which at least two second factor values are respectively applied, as a quantized value of a first weight value from among a plurality of weight values included in the pre-trained AI model; obtain training data for updating the pre-trained AI model; and update the pre-trained AI model based on the training data. Updating the pre-trained AI model may comprise modifying the first weight value based on modifying the at least two first factor values and maintaining the at least two second factor values.

The at least two first factor values may be positive real numbers, and the at least two second factor values may be −1 or 1.

The one or more instructions may further cause the one or more processors to: determine the at least two first factor values as a same value for the first weight value and a second weight value from among the plurality of weight values, and determine the at least two second factor values as different values for each of the first weight value and the second weight value.

The one or more instructions may further cause the one or more processors to: based on an accuracy of the pre-trained AI model being equal to or less than a reference value, determine the pre-trained AI model as the pre-trained AI model of a first phase; and based on the accuracy being greater than the reference value, determine the pre-trained AI model as the pre-trained AI model of a second phase.

The one or more instructions may further cause the one or more processors to: update the pre-trained AI model of the second phase based on modifying the at least two first factor values, and maintaining the at least two second factor values.

The one or more instructions may further cause the one or more processors to: update the pre-trained AI model of the first phase based on modifying the first weight value that is not quantized, or based on modifying the at least two first factor values or the at least two second factor values, based on the training data.

Advantageous Effects of Disclosure

According to one or more embodiments of the disclosure, because the amount of computation required to update an AI model is reduced, the AI model may be rapidly updated even in an electronic device with relatively low performance.

BRIEF DESCRIPTION OF DRAWINGS

The above and other aspects, features, and advantages of certain embodiments of the present disclosure will be more apparent from the following description taken in conjunction with the accompanying drawings, in which.

MODE OF DISCLOSURE

Figure 1:
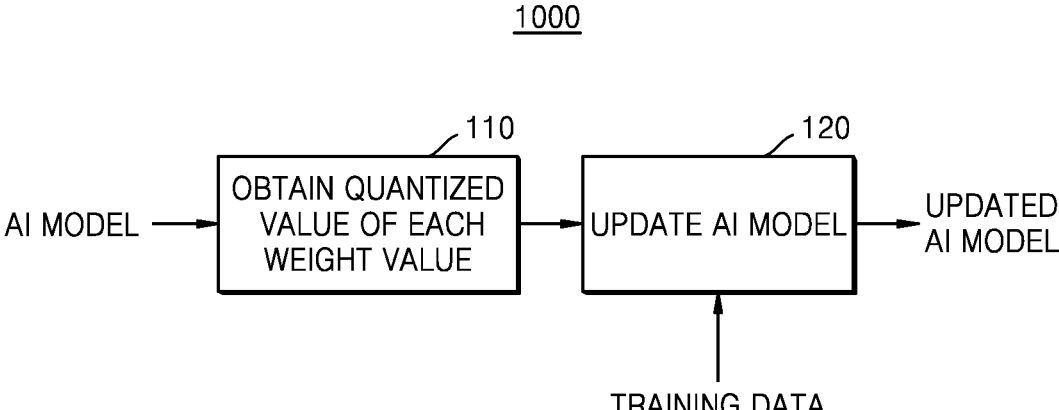
FIG. 1 is a block diagram illustrating an example of updating an AI model, according to an embodiment of the disclosure.

Throughout the disclosure, the expression "at least one of a, b or c" indicates only a, only b, only c, both a and b, both a and c, both b and c, all of a, b, and c, or variations thereof.

Embodiments of the disclosure will now be described more fully with reference to the accompanying drawings for one of ordinary skill in the art to be able to practice the example embodiments of the disclosure without difficulty. However, the disclosure may be embodied in many different forms and is not limited to the embodiments of the disclosure set forth herein. For clarity, portions irrelevant to the descriptions of the disclosure are omitted in the drawings, and like components are denoted by like reference numerals throughout the specification.

Throughout the specification, when a component is referred to as being "connected" to another component, it will be understood to include that the component is "directly connected" to the other component or is "electrically connected" to the other component with another component therebetween. When a portion "includes" an element, another element may be further included, rather than excluding the existence of the other element, unless otherwise described.

A function related to AI according to the disclosure is performed by a processor and a memory. The processor may be configured as one or more processors. In this case, the one or more processors may be a general-purpose processor such as a central processing unit (CPU), an application processor (AP), or a digital signal processor (DSP), a graphics processor such as a graphics processing unit (GPU) or a vision processing unit (VPU), or an AI processor such as a neural processing unit (NPU). The one or more processors control input data to be processed according to pre-defined operation rules or an AI model stored in the memory. Alternatively, when the one or more processors are AI processors, the AI processors may be designed in a hardware structure specialized for processing a specific AI model.

The pre-defined operation rules or the AI model may be created through training. Here, "created through training" means that, as a basic AI model is trained by using a plurality of pieces of training data according to a training algorithm, pre-defined operation rules or an AI model set to perform desired characteristics (or purposes) is created. Such training may be performed on a device in which AI according to the disclosure is conducted or may be performed through a separate server and/or system. Examples of the training algorithm include, but are not limited to, supervised learning, unsupervised learning, semi-supervised learning, and reinforcement learning.

An AI model may include a plurality of neural network layers. Each of the neural network layers includes a plurality of nodes and weight values, and performs a neural network arithmetic operation via an arithmetic operation between an arithmetic operation result of a previous layer and the plurality of weight values. The weight values of the neural network layers may be optimized through a result of training the AI model. For example, the plurality of weight values may be updated to reduce or optimize a loss value or a cost value obtained by the AI model during a learning process. An artificial neural network may include a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network, but is not limited thereto.

Hereinafter, the disclosure will be described in detail with reference to the accompanying drawings.

FIG. 1 is a block diagram illustrating an example of updating an AI model, according to an embodiment of the disclosure.

Referring to FIG. 1, an electronic device 1000 according to an embodiment of the disclosure may update an AI model, based on training data.

According to an embodiment of the disclosure, the AI model may include various types of models that may be updated, based on various types of training data obtained by the electronic device 1000. For example, the AI model may include various types of models such as a CNN, an RNN, and a DNN. The electronic device 1000 according to an embodiment of the disclosure may provide various services to a user, by performing an operation, based on the updated AI model.

The electronic device 1000 according to an embodiment of the disclosure may be implemented in various ways. Examples of the electronic device 1000 may include, but are not limited to, a digital camera, a smartphone, a laptop computer, a tablet personal computer (PC), an e-book terminal, a digital broadcasting terminal, a personal digital assistant (PDA), a portable multimedia player (PMP), a navigation device, an MP3 player, and a vehicle.

Also, the electronic device 1000 according to an embodiment of the disclosure may be a wearable device that may be worn on the user. The wearable device may include at least one of, but not limited to, an accessory type device (e.g., a watch, a ring, a wrist band, an ankle band, a necklace, glasses, or a contact lens), a head-mounted device (HMD), a textile or apparel integrated device (e.g., electronic clothing), a body-attachable device (e.g., a skin pad), or an implantable device (e.g., an implantable circuit).

Also, the electronic device 1000 according to an embodiment of the disclosure is not limited to a device that may be directly used by the user, and may be a high-performance server device. The disclosure is not limited thereto, and the electronic device 1000 may be any of various types of devices capable of updating an AI model.

The electronic device 1000 according to an embodiment of the disclosure may obtain a pre-trained AI model, and may update the obtained AI model. The electronic device 1000 according to an embodiment of the disclosure may update the pre-trained AI model and may obtain an AI model suitable for the user, so that a result suitable for a surrounding situation and the user's state which are continuously changed is output from the AI model.

The electronic device 1000 according to an embodiment of the disclosure may perform an updating operation for increasing an accuracy on the pre-trained AI model, so that the accuracy is equal to or greater than a reference value. When the accuracy of the AI model according to an embodiment of the disclosure is equal to or greater than the reference value, a degree to which the amount of computation required to update the AI model increases may be greater than a degree to which the accuracy of the AI model increases. Accordingly, when the accuracy of the AI model is equal to or greater than the reference value, in order to reduce the amount of computation required to update the AI model, the updating operation of the AI model may be performed according to operations 110 and 120.

The disclosure is not limited thereto, and the electronic device 1000 may obtain the pre-trained AI model according to various methods, and may perform the updating operation of the AI model according to operations 110 and 120.

In operation 110, the electronic device 1000 according to an embodiment of the disclosure may obtain a quantized value of at least one weight value included in an AI model.

The AI model according to an embodiment of the disclosure may include a plurality of nodes, and as different weight values are applied to input values for respective nodes, a result value may be output from the AI model. Thus, when a weight value is modified, a result value output from the AI model may vary, for the same input value. Accordingly, the AI model according to an embodiment of the disclosure may be updated by modifying a weight value so that a result value output from the AI model is more similar to labeled data.

According to an embodiment of the disclosure, when the weight value modified according to the updating operation of the AI model is quantized and represented, a data size required to represent the weight value may be reduced, and thus the amount of computation required to update the AI model may be reduced.

A plurality of weight values according to an embodiment of the disclosure may be quantized, based on a combination of at least one first factor value and a t least one second factor value. For example, a plurality of weight values w1, w2, and w3 may be quantized, as shown in Equation 1, by respectively applying second factor values b11 through b33 to first factor values a1, a2, and a3.

$$w1 \approx a1*b11 + a2*b12 + a3*b13$$

$$w2 \approx a1*b21 + a2*b22 + a3*b23$$

$$w3 \approx a1*b31 + a2*b32 + a3*b33 \qquad \text{[Equation 1]}$$

Equation 1 may be expressed as a matrix, as shown in Equation 2.

$$W = (w1\ w2\ w3) \approx a1(b11\ b21\ b31) + a2(b12\ b22\ b32) + a3(b13\ b23\ b33) \qquad \text{[Equation 3]}$$

Accordingly, according to an embodiment of the disclosure, because at least one first factor value (e.g., a1, a2, and a3) is determined and used as the same value for a plurality of weight values, a size of data used to represent quantized values of the plurality of weight values may be reduced.

According to an embodiment of the disclosure, as the number of first factor values used to represent a quantized value of each weight value increases, an error between an un-quantized weight value and a quantized value is minimized, thereby increasing an accuracy of an AI model.

However, as the number of first factor values increases, the amount of computation may accordingly increase. Accordingly, according to an embodiment of the disclosure, an appropriate number of first factor values may be determined, according to the amount of computation suitable for the performance of a device (e.g., the electronic device 1000) for updating the AI model.

A second factor value b, which is independently determined for each weight value, may be applied to each first factor value a. According to an embodiment of the disclosure, as a second factor value is independently determined for each weight value, in contrast to a first factor value, there may be as many second factor values as first factor values.

For example, when three different first factor values (e.g., a1, a2, and a3) are used to represent quantized values of three weight values, data for representing the three first factor values may be used. In contrast, because second factor values (e.g., b11, b12, b13, b21, b22, b23, b31, b32, and b33) are not shared among the three weight values, data for representing nine second factor values, which are independently determined for each first factor value and each weight value, may be used.

A weight value and a first factor value according to an embodiment of the disclosure may each be a real number, which may be represented as 16 or 32-bit data. Also, when a second factor value is determined to be one of −1 and +1, a first factor value may be determined to be a positive real number. Accordingly, because a second factor value determines the sign of a first factor value, quantized values of different weight values may be represented by using the same combination of first factor values.

For example, when a weight value is quantized by using two first factor values a1 and a2 and a second factor value of −1 or +1 is applied to the two first factor values, the weight value may be quantized to a value having a smallest difference from the weight value, from among four values a1+a2, a1−a2, −a1+a2, and −a1−a2. Accordingly, four different quantized values may be determined, by using only two first factor values.

A second factor value according to an embodiment of the disclosure may be independently determined for each weight value, and may be determined to be a value that may be represented as data having a smaller size (e.g., a smaller number of bits) than a first factor value and a weight value. For example, a second factor value may be determined to be one of −1 and +1, and in this case, the second factor value may be represented as 1-bit binary data that may represent −1 or +1. Accordingly, even when there are more second factor values than weight values and first factor values, for example, even when the number of second factor values corresponds to the number obtained by multiplying the number of weight values by the number of first factor values, a size of data used to store a plurality of second factor values for a plurality of weight values may be quite small.

A first factor value according to an embodiment of the disclosure may be determined, based on a plurality of weight values, shared by the first factor value. For example, a1 may be determined to be an average value of w1, w2, and w3. Also, a2 may be determined to be an average value of difference values between w1, w2, and w3 and a value obtained by applying a second factor value to a1 (e.g., a1\*b11, a1\*b21, and a1\*b31). Also, a3 may be determined to be an average value of difference values between w1, w2, and w3 and a value obtained by adding a value obtained by applying a second factor value to a2 and a value obtained by applying a second factor value to a1 (e.g., a1\*b11+a2\*b12, a1\*b21+a2\*b22, and a1\*b31+a2\*b32).

The disclosure is not limited to an example where a first factor value is determined to be an average value, and each first factor value may be determined according to various methods as a combination of at least one first factor value for representing a quantized value approximate to each of a plurality of weight values.

According to an embodiment of the disclosure, an AI model obtained by the electronic device 1000 may be an AI model that is pre-trained based on a value quantized according to a first factor value and a second factor value, for each weight value. In this case, because the weight value of the AI model is already replaced with the value quantized according to the first factor value and the second factor value, the electronic device 1000 according to an embodiment of the disclosure may obtain the quantized value of the weight value, represented based on the first factor value and the second factor value, from the AI model, in operation 110.

In contrast, according to an embodiment of the disclosure, an AI model obtained by the electronic device 1000 may be an AI model that is pre-trained based on a value that is not quantized for each weight value, for example, a value in which each weight value is represented as 16-bit data or 32-bit data. In this case, the electronic device 1000 according to an embodiment of the disclosure may determine at least one first factor value and second factor value for quantizing a plurality of weight values included in the AI model, and may obtain quantized values of the plurality of weight values, in operation 110.

In operation 120, the electronic device 1000 according to an embodiment of the disclosure may update the AI model, based on training data obtained by the electronic device 1000.

The training data according to an embodiment of the disclosure may include a pair of input information and output information of the AI model. According to an embodiment of the disclosure, when the input information of the training data is input to the AI model, the AI model may be updated so that a target answer to the input information included in the training data is output from the AI model. For example, the AI model may be updated, by modifying at least one weight value included in the AI model.

The training data according to an embodiment of the disclosure may be obtained, according to a change in a situation such as information regarding a surrounding environment of the electronic device 1000 and state information of the user. For example, the training data may be obtained, as a pair of the same input information and output information suitable for the changed situation, so that a result suitable for the user according to the changed situation is output from the AI model.

The training data according to an embodiment of the disclosure may be obtained based on various information regarding the surrounding environment and the user directly collected by the electronic device 1000, but the disclosure is not limited thereto, and the training data may be obtained, based on information received from an external source. The training data according to an embodiment of the disclosure may be obtained, based on information obtained by using various methods, to update the AI model.

In operation 120, the electronic device 1000 according to an embodiment of the disclosure may update the AI model, by modifying the quantized weight value. However, the electronic device 1000 may modify the quantized weight value, based on the training data, by modifying a first factor value while a second factor value from among factor values representing the quantized weight value is fixed (maintained).

Because the second factor value according to an embodiment of the disclosure has a value of −1 or 1, the second factor value may be applied to the first factor value and may affect the sign of the first factor value. Accordingly, when the sign of the first factor value constituting the quantized weight value is fixed (maintained), the quantized weight value may be modified, by considering only the first factor value that is a real number without considering modification of the sign.

When a pre-trained AI model whose accuracy is equal to or greater than a reference value is repeatedly updated, the accuracy of the AI model may more slowly increase than when an AI model whose accuracy is equal to or less than the reference value is updated. Accordingly, when the AI model whose accuracy is equal to or greater than the reference value is updated, the amount of computation further increases, and thus a degree to which the accuracy increases may be less than a degree to which the amount of computation required to update the AI model increases.

Accordingly, according to an embodiment of the disclosure, because a second factor value is fixed (maintained) and at least one first factor value is modified, a range within which a quantized weight value may be modified may be reduced, thereby reducing the amount of computation. Also, because at least one first factor value is determined as the same value for a plurality of weight values, the number of first factor values that may be modified may be less than the number of weight values and the number of second factor values, thereby reducing the amount of computation.

According to an embodiment of the disclosure, even in the case of an AI model whose accuracy is equal to or greater than a reference value, because the amount of computation required to update the AI model may be reduced, the AI model may be rapidly updated even in the electronic device 1000 with relatively low performance.

Figure 2:
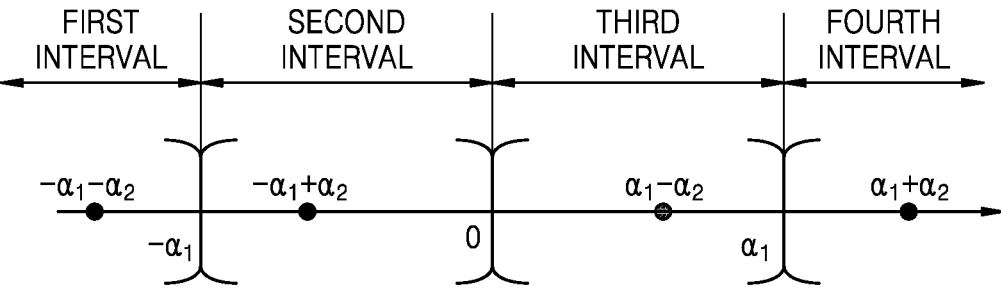
FIG. 2 is a diagram illustrating an example of quantizing a weight value, according to an embodiment of the disclosure.

FIG. 2 is a diagram illustrating an example of quantizing a weight value, according to an embodiment of the disclosure.

Referring to FIG. 2, a weight value according to an embodiment of the disclosure may be quantized to a value corresponding to an interval to which the weight value belongs from among first through fourth intervals.

According to an embodiment of the disclosure, at least one first factor value for quantizing a weight value may be determined to be $a_1$ and $a_2$ that are values suitable to replace the one weight value, based on at least one weight value.

In FIG. 2, a first interval may be set to be a range between a minimum value of a weight value and $-a_1$. Also, a second interval may be set to be a range between $-a_1$ and 0, a third interval may be set to be a range between 0 and $a_1$, and a fourth interval may be set to be a range between $a_1$ and a maximum value of the weight value.

According to an embodiment of the disclosure, after $a_1$ and $a_2$ that are first factor values are determined based on a plurality of weight values, a weight value may be quantized, according to an interval to which each weight value belongs, based on $a_1$.

For example, when a weight value belongs to the first interval, the weight value may be quantized to $-a_1-a_2$. Also, when a weight value belongs to the second interval, the weight value may be quantized to $-a_1+a_2$. Also, when a weight value belongs to the third interval, the weight value may be quantized to $a_1-a_2$. Also, when a weight value belongs to the fourth interval, the weight value may be quantized to $a_1+a_2$.

The disclosure is not limited thereto, and when there are two or more first factor values used to quantize a weight value, an interval may be divided into as many intervals as the first factor values, thereby reducing an error due to quantization. For example, when there are three first factor values, because each first factor value may have one of two signs determined according to a second factor value of +1 or −1, eight ($2^3$) quantized values may be determined. Accordingly, because an interval is divided into eight intervals, a weight value may be quantized to one of the eight quantized values. However, as the number of first factor values increases, the amount of computation may accordingly increase. Accordingly, the number of at least one first factor value, determined for a plurality of weight values, may be determined to be a number suitable to replace the plurality of weight values, according to an error and the amount of computation caused by quantization.

Figure 3:
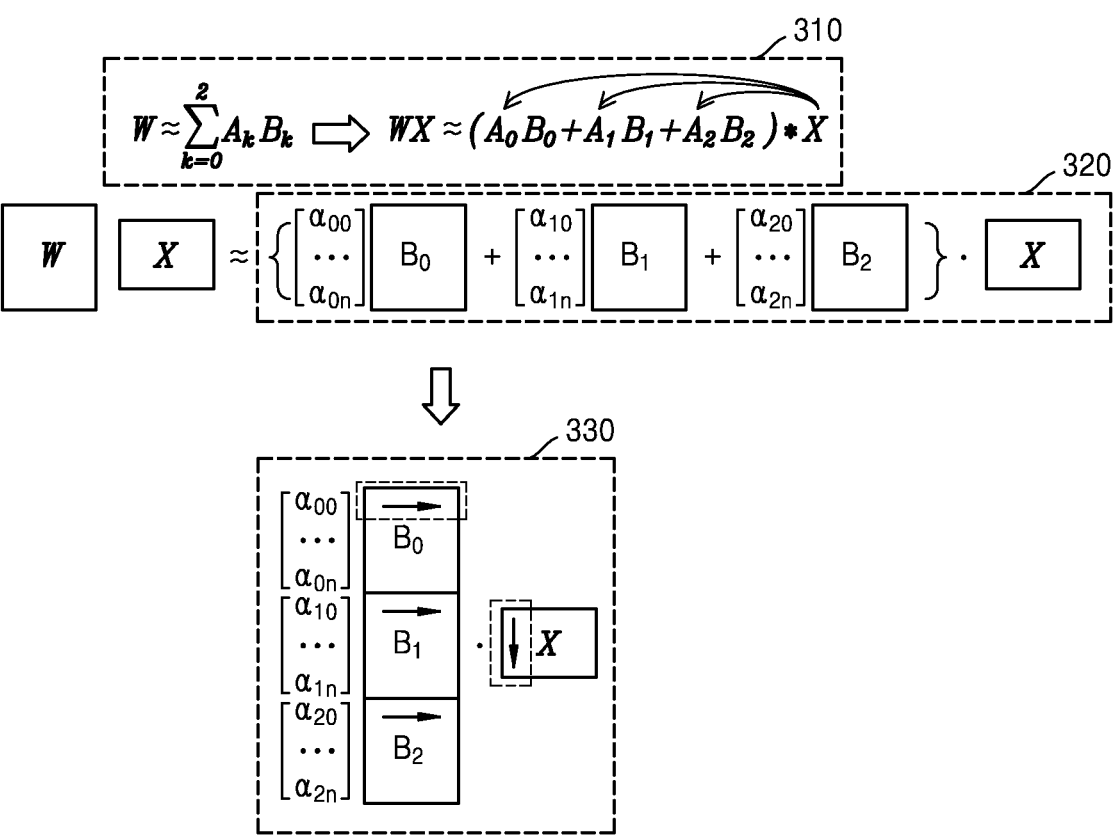
FIG. 3 is a diagram illustrating an example of updating an AI model, based on a quantized weight value, according to an embodiment of the disclosure.

FIG. 3 is a diagram illustrating an example of updating an AI model, based on a quantized weight value, according to an embodiment of the disclosure.

Referring to 310 and 320 of FIG. 3, W that is a weight matrix of N×N including a plurality of weight values may be quantized, based on matrices $A_k$ and $B_k$ respectively including a first factor value and a second factor value. An AI model may be updated, by applying a quantized weight value to X representing input values for N×N nodes.

The weight matrix W according to an embodiment of the disclosure may include N×N weight values respectively applied to the N×N nodes.

The matrix $A_k$ according to an embodiment of the disclosure may include N first factor values, determined for every N nodes. Because the first factor values are determined for every N nodes, the matrix $A_k$ may be configured as a matrix of N×1. For example, when three different first factor values are determined for every N nodes (i.e., k=2), a matrix $A_0$ may include N first factor values of $a_{00}$ to $a_{0n}$, a matrix $A_1$ may include N first factor values of $a_{10}$ to $a_{1n}$, and a matrix $A_2$ may include N first factor values of $a_{20}$ to $a_{2n}$. N weight values included in a first row of the matrix W may be quantized, based on $a_{00}$, $a_{10}$, and $a_{20}$, included in the matrices $A_0$, $A_1$, and $A_2$. Also, N weight values included in an $n-1^{th}$ row of the matrix W may be quantized, based on $a_{0n}$, $a_{1n}$, and $a_{2n}$, included in the matrices $A_0$, $A_1$, and $A_2$.

The matrix $B_k$ according to an embodiment of the disclosure may include N×N second factor values, determined for every N×N nodes. Also, each matrix $B_k$ may be applied to each $A_k$, to determine the sign of a first factor value and represent a quantized weight value. For example, when three different first factor values are determined for every N nodes (i.e., k=2), three matrices $B_0$, $B_1$, and $B_2$ as many as the matrices $A_k$ may be determined. Values included in the matrices $B_0$, $B_1$, and $B_2$ may be independently determined.

According to an embodiment of the disclosure, the multiplication of the matrices W and X may be performed as in 320, as the matrix W is quantized to $\Sigma A_k B_k$. According to an embodiment of the disclosure, first factor values of the matrix $A_k$ may be applied to a plurality of values included in the same row of Bk, to represent quantized weight values. For example, in 320, $a_{00}$ may be equally applied to a plurality of second factor values included in a first row of $B_0$, and $a_{01}$ may be equally applied to a plurality of second factor values included in a second row of $B_0$.

According to an embodiment of the disclosure, according to distributive law, the matrix X may be applied to each of $A_0B_0$, $A_1B_1$, and $A_2B_2$, as shown in 330. The matrix X may include at least one input value multiplied by a weight value at each node. According to an embodiment of the disclosure, N×N matrices $B_k$ and X may be calculated, by multiplying a second factor value of $B_k$ by an input value of the matrix X corresponding to the second factor value, in an arrow direction.

The matrix $A_k$ may be applied to a plurality of values of each corresponding row, in a matrix resulting from the multiplication of the matrices $B_k$ and X. For example, $a_{00}$ may be applied to a plurality of values included in a first row of a matrix of N×N resulting from the multiplication of $B_0$ and X. Also, $a_{01}$ may be applied to a plurality of values included in a second row of the matrix of N×N resulting from the multiplication of $B_0$ and X. Also, $a_{10}$ may be applied to a plurality of values included in a first row of a matrix of N×N that resulting from the multiplication of $B_1$ and X.

According to an embodiment of the disclosure, because the same matrix X is multiplied by three matrices $B_0$, $B_1$, and $B_2$, the three matrices $B_0$, $B_1$, and $B_2$ may be concatenated, as shown in 330, and thus multiplication operations between the three matrices $B_0$, $B_1$, and $B_2$ and the matrix X may be simultaneously performed. Accordingly, according to an embodiment of the disclosure, the number of calls of an operation (e.g., MatMul) for matrix multiplication between the matrices X and $B_k$ may be reduced.

Figure 4:
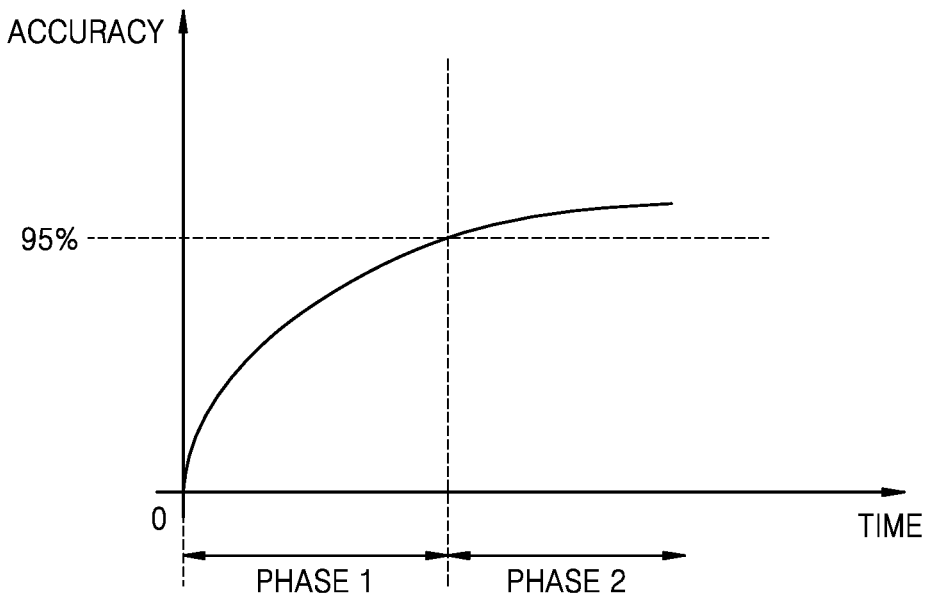
FIG. 4 is a diagram illustrating an example of updating an AI model according to an accuracy of an AI model, according to an embodiment of the disclosure.

FIG. 4 is a diagram illustrating an example of updating an AI model according to an accuracy of the AI model, according to an embodiment of the disclosure.

Referring to FIG. 4, according to an embodiment of the disclosure, an updating operation of an AI model may be performed, based on an accuracy measured for the AI model. The accuracy of the AI model according to an embodiment of the disclosure may be measured as a value indicating a probability that labeled data is output, for input information.

Phase 1 and phase 2 according to an embodiment of the disclosure may be divided, according to an accuracy changed as the AI model is repeatedly updated. For example, a reference value of the accuracy of the AI model for dividing phase 1 and phase 2 may be set to 95%, but the disclosure is not limited thereto and the reference value may be set to any of various values.

According to an embodiment of the disclosure, when the AI model is updated by, from among a first factor value and a second factor value constituting a quantized weight value, fixing (maintaining) the second factor value and modifying the first factor value, a larger error may occur than when the AI model is updated by modifying both the first factor value and the second factor value based on the same training data or updated based on a weight value that is not quantized. In contrast, because the second factor value is fixed (maintained) and only the first factor value is modified, the number of values modified based on training data may be reduced, thereby reducing the amount of computation.

Accordingly, it may be preferable to perform the updating operation of the AI model according to an embodiment of the disclosure, when an error is expected to be small and a degree to which the amount of computation increases is greater than a degree to which an accuracy increases according to the updating operation.

In the AI model of phase 1 according to an embodiment of the disclosure, as the updating operation is repeatedly performed, based on a lot of training data initially, an accuracy may rapidly increase compared to the amount of computation. Accordingly, the AI model of phase 1 may be relatively largely modified based on the training data, and a larger error may occur. Accordingly, in order to reduce an error caused by the updating operation, the AI model of phase 1 according to an embodiment of the disclosure may be updated based on a weight value that is not quantized, or may be updated by considering both a first factor value and a second factor value and modifying at least one of the first factor value or the second factor value.

In contrast, in the AI model of phase 2 according to an embodiment of the disclosure, a degree to which the amount of computation increases according to the updating operation is greater than a degree to which an accuracy increases, when compared to the AI model of phase 1. Also, according to an embodiment of the disclosure, as the AI model is updated and an accuracy is equal to or greater than a reference value, a degree to which the AI model is modified is small, compared to the AI model of phase 1, and thus an error occurring as the AI model is updated may be small. Accordingly, according to an embodiment of the disclosure, for the AI model of phase 2, the electronic device 1000 according to an embodiment of the disclosure may update the AI model by fixing (maintaining) a second factor value and modifying a first factor value of the AI model.

The AI model of phase 1 according to an embodiment of the disclosure may be an AI model that may be repeatedly updated, until an accuracy is equal to or greater than a reference value, based on a large amount of training data provided by an external server device. The AI model of phase 1 according to an embodiment of the disclosure may be updated based on a weight value that is not quantized, or may be updated by modifying a first factor value and a second factor value constituting a quantized weight value.

Also, the AI model of phase 2 according to an embodiment of the disclosure may be an AI model having an accuracy that is equal to or greater than the reference value, received from the external server device by the electronic device 1000. The electronic device 1000 according to an embodiment of the disclosure may update the AI model of phase 2, based on various training data related to a user collected by the electronic device 1000. The AI model of phase 2 according to an embodiment of the disclosure may be updated by fixing (maintaining) a second factor value and modifying a first factor value from among the first and second factor values constituting a quantized weight value based on training data, in contrast to the AI model of phase 1.

Figure 5:
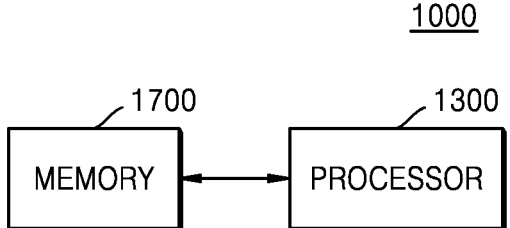
FIG. 5 is a block diagram for describing an internal configuration of an electronic device, according to an embodiment of the disclosure.

FIG. 5 is a block diagram for describing an internal configuration of the electronic device 1000, according to an embodiment of the disclosure.

Figure 6:
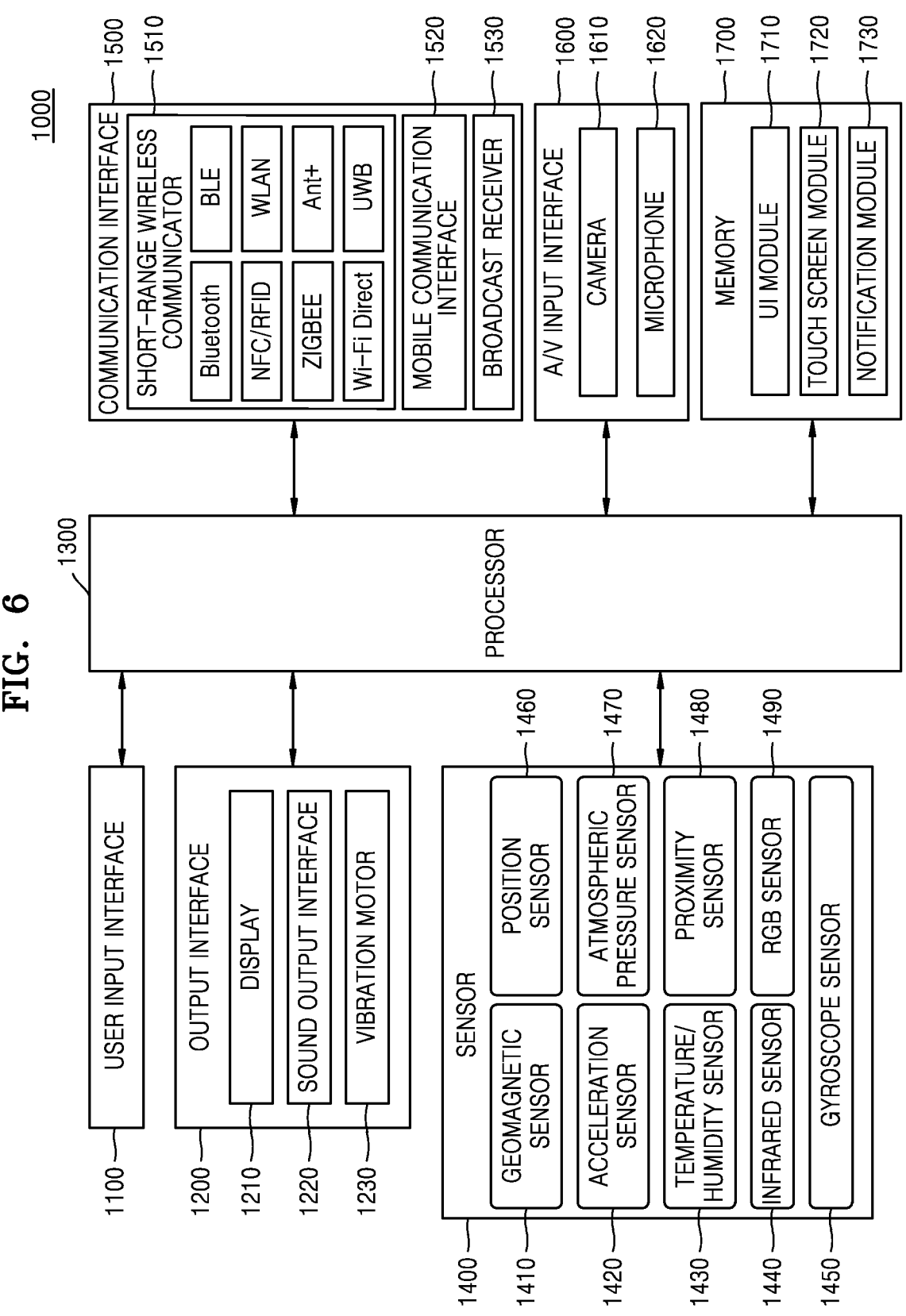
FIG. 6 is a block diagram for describing an internal configuration of an electronic device, according to an embodiment of the disclosure.

FIG. 6 is a block diagram for describing an internal configuration of the electronic device 1000, according to an embodiment of the disclosure.

Referring to FIG. 5, the electronic device 1000 may include a processor 1300 and a memory 1700. However, the electronic device 1000 may include more elements than those illustrated in FIG. 5, or may include fewer elements than those illustrated in FIG. 5.

For example, as shown in FIG. 6, the electronic device 1000 according to an embodiment of the disclosure may further include a user input interface 1100, an output interface 1200, a sensor 1400, a communication interface 1500, and an audio/video (AN) input interface 1600 in addition to the processor 1300 and the memory 1700.

The user input interface 1100 may receive a user input for controlling the electronic device 1000. Examples of the user input interface 1100 may include, but are not limited to, a key pad, a dome switch, a touch pad (e.g., contact capacitance type, pressure resistive type, infrared (IR) detection type, surface ultrasonic wave conduction type, integral tension measuring type, or piezoelectric effect type), a jog wheel, and a jog switch.

According to an embodiment of the disclosure, the user input interface 1100 may receive a user input related to an operation of updating an AI model. For example, training data used to update the AI model may be collected, based on the user input received by the electronic device 1000.

The output interface 1200 may output an audio signal, a video signal, or a vibration signal, and the output interface 1200 may include a display 1210, a sound output interface 1220, and a vibration motor 1230.

The display 1210 displays information processed by the electronic device 1000. According to an embodiment of the disclosure, the display 1210 may display information related to an operation of updating the AI model. For example, the display 1210 may display information indicating that the AI model is updated by the electronic device 1000. The disclosure is not limited thereto, and the display 1210 may display various types of information related to an updating operation of the AI model.

When the display 1210 and a touch pad are configured as a touch screen by forming a layer structure, the display 1210 may be used as an input device as well as an output device. The display 1210 may include at least one of a liquid crystal display, a thin-film transistor-liquid crystal display, an organic light-emitting diode, a flexible display, a three-dimensional (3D) display, or an electrophoretic display. The electronic device 1000 may include two or more displays 1210 according to an implementation type of the electronic device 1000.

The sound output interface 1220 outputs audio data received from the communication interface 1500 or stored in the memory 1700. Also, the vibration motor 1230 may output a vibration signal. Also, the vibration motor 1230 may output a vibration signal when a touch is input to the touch screen. The sound output interface 1220 and the vibration motor 1230 according to an embodiment of the disclosure may output various types of information related to an updating operation of the AI model.

The processor 1300 controls an overall operation of the electronic device 1000. For example, the processor 1300 may execute programs stored in the memory 1700 to control the user input interface 1100, the output interface 1200, the sensor 1400, the communication interface 1500, and the AN input interface 1600.

The electronic device 1000 may include at least one processor 1300. For example, the electronic device 1000 may include various types of processors such as a central processing unit (CPU), a graphics processing unit (GPU), and a neural processing unit (NPU).

The processor 1300 may be configured to process commands of a computer program by performing a basic calculation, a logic, and input or output arithmetic operation. The commands may be provided from the memory 1700 to the processor 1300, or may be received through the communication interface 1500 and may be provided to the processor 1300. For example, the processor 1300 may be configured to execute the commands according to program code stored in a recording device such as a memory.

The processor 1300 according to an embodiment of the disclosure may obtain a sum, of at least two first factor values, that is obtained by respectively applying at least two second factor values to each of the at least two first factor values. The processor 1300 may obtain the sum as a quantized value of a first weight value from among a plurality of weight values included in the AI model. Also, the processor 1300 may update the AI model, by modifying a first factor value while a second factor value is fixed (maintained), to modify the first weight value, based on training data.

The sensor 1400 may detect a state of the electronic device 1000 or a surrounding state of the electronic device 1000, and may transmit detected information to the processor 1300.

The sensor 1400 may include at least one of, but not limited to, a geomagnetic sensor 1410, an acceleration sensor 1420, a temperature/humidity sensor 1430, an infrared sensor 1440, a gyroscope sensor 1450, a position sensor 1460 (e.g., a global positioning system (GPS)), an atmospheric pressure sensor 1470, a proximity sensor 1480, or a red, green, blue (RGB) sensor (e.g., an illuminance sensor) 1490.

The information detected by the sensor 1400 according to an embodiment of the disclosure may be obtained as training data used to update the AI model.

The communication interface 1500 may include one or more elements enabling the electronic device 1000 to communicate with a server 2000 or an external device. For example, the communication interface 1500 may include a short-range wireless communication interface 1510, a mobile communication interface 1520, and a broadcast receiver 1530.

Examples of the short-range wireless communication interface 1510 may include, but are not limited to, a Bluetooth communication interface, a Bluetooth low energy (BLE) communication interface, a near-field communication interface, a wireless local area network (WLAN) communication interface, a Wi-Fi communication interface, a Zigbee communication interface, an infrared data association (IrDA) communication interface, a Wi-Fi direct (WFD) communication interface, an ultra-wideband (UWB) communication interface, and an Ant+ communication interface.

The mobile communication interface 1520 transmits and receives a wireless signal to and from at least one of a base station, an external terminal, or a server, on a mobile communication network. Here, the wireless signal may include various types of data according to exchange of a voice call signal, a video call signal, or a text/multimedia message.

The broadcast receiver 1530 receives a broadcast signal and/or broadcast-related information from an external source through a broadcast channel. Examples of the broadcast channel may include a satellite channel and a terrestrial channel. According to an embodiment of the disclosure, the electronic device 1000 may not include the broadcast receiver 1530.

According to an embodiment of the disclosure, the communication interface 1500 may transmit and receive various types of information to and from the outside. For example, the communication interface 1500 may receive a pre-trained AI model from the outside. The AI model received from the outside according to an embodiment of the disclosure may be an AI model of phase 2 that is pre-trained by a high-performance server device and has an accuracy equal to or greater than a reference value.

The AN input interface 1600 for inputting an audio signal or a video signal may include a camera 1610 and a microphone 1620. The camera 1610 may obtain image frames such as a still image or a moving image via an image sensor, in a video call mode or an imaging mode. An image captured by the image sensor may be processed by the processor 1300 or a separate image processor. The microphone 1620 receives an external sound signal and processes the external sound signal into electrical voice data.

An audio signal input or a video signal input obtained by the AN input interface 1600 according to an embodiment of the disclosure may be obtained as training data used to update the AI model. The disclosure is not limited thereto, and an audio signal input or a video signal input obtained by the AN input interface 1600 may be used in various ways in relation to an updating operation of the AI model.

The memory 1700 may store a program for processing and controlling the processor 1300, and store data input to or output from the electronic device 1000.

The memory 1700 according to an embodiment of the disclosure may store a pre-trained AI model. For example, the memory 1700 may store a pre-trained AI model received from an external source, and an updating operation of the AI model may be repeatedly performed based on training data that is collected in real time. The disclosure is not limited thereto, and the memory 1700 may store various information that may be used in relation to an updating operation of the AI model.

The memory 1700 may include at least one type of non-transitory storage medium of a flash memory type, a hard disk type, a multimedia card micro type, a card type memory (e.g., a secure digital (SD) or extreme digital (XD) memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

Programs stored in the memory 1700 may be classified into a plurality of modules based on functions, and for example, may be classified into a user interface (UI) module 1710, a touch screen module 1720, and a notification module 1730.

The UI module 1710 may provide a specialized UI or graphics user interface (GUI), which interoperates with the electronic device 1000 for each application. The touch screen module 1720 may detect a touch gesture of the user on a touch screen and may transmit information about the touch gesture to the processor 1300. The touch screen module 1720 according to an embodiment of the disclosure of the disclosure may recognize and analyze touch code. The touch screen module 1720 may be configured as separate hardware including a controller.

Various sensors may be provided inside or near the touch screen to detect a touch or a proximity touch on the touch screen. An example of a sensor for detecting the touch on the touch screen includes a tactile sensor. The tactile sensor refers to a sensor for detecting a contact of a specific object to the same or more extent that a person is capable of feeling. The tactile sensor may detect various information such as roughness of a contact surface, stiffness of a contact object, and a temperature of a contact point.

Examples of the touch gesture of the user may include tapping, touching and holding, double tapping, dragging, panning, flicking, dragging and dropping, and swiping.

The notification module 1730 may generate a signal for notifying event occurrence of the electronic device 1000.

Figure 7:
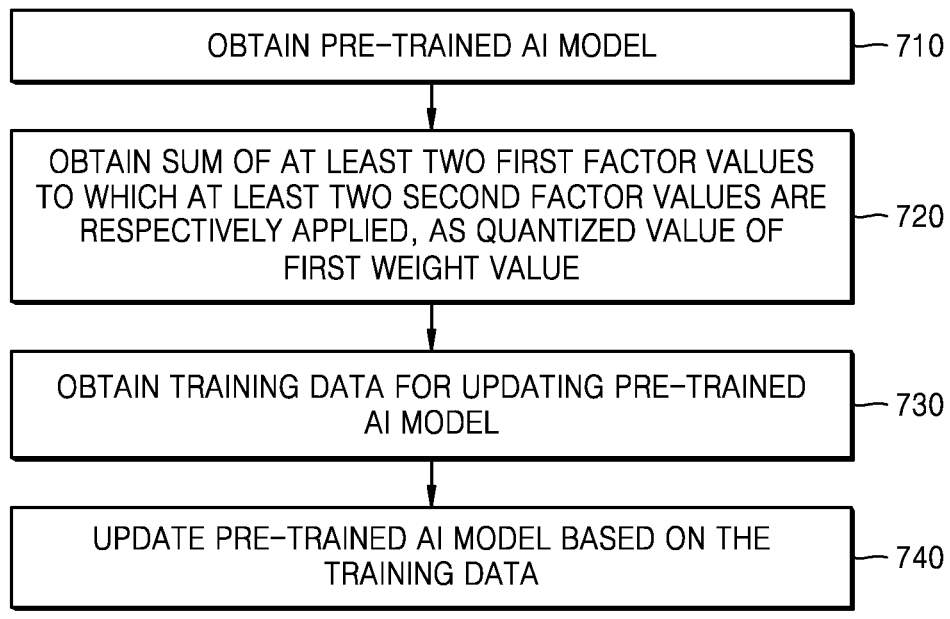
FIG. 7 is a flowchart illustrating a method of updating an AI model, according to an embodiment of the disclosure.

FIG. 7 is a flowchart illustrating a method of updating an AI model, according to an embodiment of the disclosure.

Referring to FIG. 7, in operation 710, the electronic device 1000 according to an embodiment of the disclosure may obtain a pre-trained AI model. The obtained AI model according to an embodiment of the disclosure may be an AI model of phase 2 obtained from an external server device. The disclosure is not limited thereto, and the obtained AI model according to an embodiment of the disclosure may be an AI model whose accuracy is equal to or greater than a reference value.

In operation 720, the electronic device 1000 according to an embodiment of the disclosure may obtain a sum, of at least two first factor values to which at least two second factor values are respectively applied, as a quantized value of a first weight value from among a plurality of weight values included in the AI model. A weight value according to an embodiment of the disclosure may be quantized to a combination of at least one first factor value, and a quantized value may be determined to be a different value as at least one second factor value is applied to the first factor value.

Because a weight value according to an embodiment of the disclosure is quantized based on a first factor value and a second factor value, a size of data used to represent each weight value may be reduced. Accordingly, the amount of computation required to update the AI model by modifying the weight value may be reduced.

In operation 730, the electronic device 1000 according to an embodiment of the disclosure may obtain training data that may be used to update the AI model. The training data according to an embodiment of the disclosure may include various types of information collected by the electronic device 1000. The electronic device 1000 according to an embodiment of the disclosure may continuously obtain various types of information related to an operation of the AI model, and may repeatedly update the AI model based on the information. Accordingly, because a surrounding situation that is continuously changed is reflected in the AI model, a result suitable for a user may be provided.

In operation 740, the electronic device 1000 according to an embodiment of the disclosure may update the AI model based on the the training data. The electronic device 1000 according to an embodiment of the disclosure may update the AI model by, from among the first factor value and the second factor value constituting the quantized first weight value, modifying the first factor value while the second factor value is fixed (maintained). Accordingly, in the AI model, as the number of values modified based on the training data is reduced, the amount of computation required for the electronic device 1000 to update the AI model may be accordingly reduced.

According to an embodiment of the disclosure, as the amount of computation required to update the AI model is reduced, the AI model may be rapidly updated even in an electronic device with relatively low performance.

A machine-readable storage medium may be provided as a non-transitory storage medium. Here, 'non-transitory' means that the storage medium is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in the form of a machine-readable storage medium (e.g., a compact disc read only memory (CD-ROM)), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a manufacturer's server, a server of an application store, or a relay server.

Also, the term "unit" used herein may be a hardware component such as a processor or a circuit and/or a software component executed by a hardware component such as a processor.

The above description of the disclosure is provided for illustration, and it will be understood by one of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

The scope of the disclosure is defined by the appended claims rather than the detailed description, and all changes or modifications within the scope of the appended claims and their equivalents will be construed as being included in the scope of the disclosure.

The invention claimed is:

1. A method, performed by an electronic device comprising at least one processor, the method comprising:
   obtaining, from an external device or memory of the electronic device, a pre-trained artificial intelligence (AI) model;
   obtaining, by the at least one processor comprising processing circuitry, at least two factor values and at least two sign values based on a first weight value from among a plurality of weight values included in the pre-trained AI model, wherein the at least two factor values are determined positive real numbers, and wherein the at least two sign values are determined −1 or 1;
   obtaining, from the external device or via an input interface of the electronic device, training data for updating the pre-trained AI model; and
   updating, by the at least one processor, the pre-trained AI model based on the training data by modifying the at least two factor values without changing the at least two sign values,
   wherein the obtaining the at least two factor values and the at least two sign values comprises:
      determining a first factor value among the at least two factor values based on an average value determined by using the first weight value and a second weight value from among the plurality of weight values, wherein the first factor value is determined to have a same value for the first weight value and the second weight value;
      determining a second factor value among the at least two first-factor values based on the average value and the first factor value; and
      determining the at least two sign values based on a difference between the first weight value and a value obtained by applying the at least two factor values to the at least two sign values, wherein the at least two sign values are determined independently for the first weight value and the second weight value.

2. The method of claim 1, wherein the training data comprises information obtained as a surrounding situation of the electronic device or state information of a user is continuously changed, and
   wherein the pre-trained AI model is repeatedly updated, based on the training data.

3. An electronic device comprising:
   at least one processor comprising processing circuitry; and
   memory comprising one or more storage media storing at least one instruction that, when executed by the at least one processor individually or collectively, cause the electronic device to:
   obtain, from an external device or memory of the electronic device, a pre-trained artificial intelligence (AI) model;
   obtain at least two factor values and at least two sign values based on a first weight value from among a plurality of weight values included in the pre-trained AI model, wherein the at least two first-factor values are determined positive real numbers, and wherein the at least two sign values are determined −1 or 1,
   obtain, from the external device or via an input interface of the electronic device, training data for updating the pre-trained AI model, and
   update the pre-trained AI model based on the training data by modifying the at least two factor values without changing the at least two sign values,
   wherein the at least one instruction, when executed by the at least one processor individually or collectively, further cause the electronic device to:
      determine a first factor value among the at least two factor values based on an average value determined by using the first weight value and a second weight value from among the plurality of weight values, wherein the first factor value is determined to have a same value for the first weight value and the second weight value;
      determine a second factor value among the at least two factor values based on the average value and the first factor value; and
      determine the at least two sign values based on a difference between the first weight value and a value obtained by applying the at least two first-factor values to the at least two sign values, wherein the at least two sign values are determined independently for the first weight value and the second weight value.

4. The electronic device of claim 3, wherein the training data comprises information obtained as a surrounding situation of the electronic device or state information of a user is continuously changed, and
   wherein the pre-trained AI model is repeatedly updated, based on the training data.

5. A non-transitory computer-readable medium storing one or more instructions that, when executed by one or more processors of an electronic device, cause the one or more processors to:
   obtain, from an external device or memory of the electronic device, a pre-trained artificial intelligence (AI) model;
   obtain at least two factor values and at least two sign values based on a first weight value from among a plurality of weight values included in the pre-trained AI model, wherein the at least two factor values are determined positive real numbers, and wherein the at least two sign values are determined −1 or 1;
   obtain, from the external device or via an input interface of the electronic device, training data for updating the pre-trained AI model; and
   update the pre-trained AI model based on the training data by modifying the at least two factor values without changing the at least two sign values, wherein the one or more instructions, when executed by the one or more processors, further cause the one or more processors to:

determine a first factor value among the at least two first-factor values based on an average value determined by using the first weight value and a second weight value from among the plurality of weight values, wherein the first factor value is determined to have a same value for the first weight value and the second weight value;

determine a second factor value among the at least two factor values based on the average value and the first factor value; and determine the at least two sign values based on a difference between the first weight value and a value obtained by applying the at least two factor values to the at least two sign values, wherein the at least two sign values are determined independently for the first weight value and the second weight value.

* * * * *